United States Patent
Matsumoto

(10) Patent No.: US 6,706,211 B2
(45) Date of Patent: Mar. 16, 2004

(54) PROCESS FOR PRODUCING INORGANIC FINE GRAINS, INORGANIC FINE GRAINS, RARE EARTH ELEMENT-ACTIVATED BARIUM FLUOROHALIDE FLUORESCENT SUBSTANCE, AND RADIATION IMAGE CONVERSION PANEL

(75) Inventor: Hiroshi Matsumoto, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 29 days.

(21) Appl. No.: 10/096,794

(22) Filed: Mar. 14, 2002

(65) Prior Publication Data
US 2003/0005552 A1 Jan. 9, 2003

(30) Foreign Application Priority Data
Mar. 15, 2001 (JP) ........................................ 2001-074391

(51) Int. Cl.$^7$ .............................................. C09K 11/61
(52) U.S. Cl. ............................. 252/301.4 H; 423/466; 423/497; 428/690
(58) Field of Search .................. 252/301.4 H; 423/466, 423/497; 428/690

(56) References Cited

U.S. PATENT DOCUMENTS 3,981,973 A * 9/1976 Richardson ................. 423/265
6,294,147 B1 * 9/2001 Voss ........................... 423/599
6,383,412 B1 * 5/2002 Hasegawa ............ 252/301.4 H
6,444,142 B1 * 9/2002 Matsumoto et al. . 252/301.4 H

FOREIGN PATENT DOCUMENTS

| JP | 55-12145   | 1/1980 |
| JP | 7-233369   | 9/1995 |
| JP | 10-140148  | 5/1998 |
| JP | 11-29324   | 2/1999 |

* cited by examiner

Primary Examiner—C. Melissa Koslow
(74) Attorney, Agent, or Firm—Sughrue Mion, PLLC

(57) ABSTRACT

A process for producing inorganic fine grains in a definite form having a small grain size, the inorganic fine grains obtained by this process, a rare earth element-activated barium fluorohalide fluorescent substance made using the grains, and a radiation image conversion panel with a layer of the fluorescent substance. The process features adding, to a solution containing an inorganic compound, a solid matter substantially insoluble in the solution, promoting crystallization or precipitation in the solution to form crystal or precipitate, and separating out the resulting crystal or precipitate. The inorganic fine grains produced by this process are represented by the formula BaFI:xLn (Ln represents at least one of Ce, Pr, Sm, Eu, Tb, Dy, Ho, Nd, Er, Tm and Yb, and $0<x\leq 0.2$), have a cubic form and have a volume-average grain size of 1 to 10 µm.

17 Claims, 1 Drawing Sheet

PROCESS FOR PRODUCING INORGANIC FINE GRAINS, INORGANIC FINE GRAINS, RARE EARTH ELEMENT-ACTIVATED BARIUM FLUOROHALIDE FLUORESCENT SUBSTANCE, AND RADIATION IMAGE CONVERSION PANEL

BACKGROUND OF THE PRESENT INVENTION

1. Field of the Present Invention

The present invention relates to a process for producing inorganic fine grains, to inorganic fine grains, to a rare earth element-activated barium fluorohalide fluorescent substance, and to a radiation image conversion panel.

2. Description of the Related Art

As a fluorescent substance for a radiation image conversion panel which is used in radiography, a divalent europium-activated barium fluorohalide fluorescent substance ($BaFX:Eu^{2+}$ wherein X is at least one of Cl, Br and I; this is applied hereinafter) has been so far known. This fluorescent substance, when excited with radiation such as X-rays, electron rays or ultraviolet rays, allows near infrared luminescence (instantaneous luminescence) with maximum luminescence near 390 nm.

It has been further found that when this fluorescent substance is irradiated with the radiation and then excited with an electromagnetic wave (excitation light) in a visible to infrared region, it allows near ultraviolet luminescence, namely stimulation luminescence. As described in JP-A No. 55-12145, this fluorescent substance has attracted much interest as a fluorescent substance for a radiation image conversion panel employed in a radiation image conversion method using stimulation of the fluorescent substance. Among others, a divalent europium-activated barium fluoroiodide fluorescent substance ($BaFI:Eu^{2+}$) has a luminescence wavelength in a long wave side. Accordingly, there has been a proposal that a semiconductor laser beam having an oscillation wavelength in a near ultraviolet region is used as excitation light and this fluorescent substance is employed in combination therewith.

Barium fluoroiodide (BaFI) has been used as the divalent europium-activated barium fluoroiodide fluorescent substance or a raw material for production of barium halide fluorescent substance with divalent europium-activated iodine (so-called a fluorescent substance raw powder).

For obtaining a barium fluorohalide, a method in which at least one compound selected from the group consisting of barium carbonate, barium nitrate and barium sulfate is reacted with at least one compound selected from the group consisting of hydrogen chloride, hydrogen bromide and hydrogen fluoride to form a barium halide and the product is then reacted with hydrogen fluoride to form a barium fluorohalide has been known. However, barium fluoroiodide is, unlike barium fluorobromide, high in solubility in water. Therefore, the mere reaction of these materials in an aqueous medium is problematic in that the product cannot be obtained in satisfactorily high yield and impurities tend to be incorporated.

Further, in consideration of the fact that the resulting crystal of barium fluoroiodide are used in a radiation image conversion panel, crystal in a cubic form having volume-average grain size of not more than 10 $\mu$m are preferable. Thus, there is a demand for the development of a process to meet such requirements.

JP-A No. 7-233369 discloses a method in which $BaX_2$ is reacted with an inorganic fluoride (for example, $NH_4F$) to produce a rare earth element-activated barium fluorohalide (BaFX:Ln). JP-A No. 11-29324 discloses the method described in JP-A No. 7-233369 is applied to production of barium fluoroiodide. Crystal of barium fluoroiodide obtained by this method are square (cubic), however, volume-average grain size (Dm) of those is not less than 10 $\mu$m. When the crystal is used in the existing radiation image conversion panel, graininess is sometimes decreased.

In the method described in JP-A No. 10-140148, barium fluoroiodide grains having a small volume-average grain size can be produced, but the grain forms are indefinite. Accordingly, scattering of excitation light cannot be controlled in a radiation image conversion panel, which might cause deterioration of an image quality.

Thus, a method for producing inorganic fine grains having a definite form and a small grain size is sometimes required not only in obtaining the foregoing raw grains of the fluorescent substance but also in obtaining general inorganic fine grains.

SUMMARY OF THE PRESENT INVENTION

Under these circumstances, the present invention aims to provide a process for producing inorganic fine grains in a definite form having a small grain size, and inorganic fine grains formed by this process. Further, the present invention aims to provide a rare earth element-activated barium fluorohalide fluorescent substance using at least the inorganic fine grains formed by this process as a raw material, and a radiation image conversion panel with an excellent image quality using the rare earth element-activated barium fluorohalide fluorescent substance.

The foregoing aims are attained by the following approaches.

That is, a first aspect of a process for producing inorganic fine grains in the present invention is a process for producing inorganic fine grains, which comprises adding, to a solution containing at least one inorganic compound, a solid matter substantially insoluble in the solution, subjecting the solution to a procedure of promoting crystallization or precipitation to form crystal or precipitate, and separating the resulting crystal or precipitate.

A second aspect of the process for producing the inorganic fine grains in the present invention is the process for producing the inorganic fine grains according to the first aspect, in which the resulting crystal or precipitate is barium fluorohalide.

A third aspect of the process for producing the inorganic fine grains in the present invention is the process for producing the inorganic fine grains according to the first aspect, in which the solution is a mixture of a $BaI_2$ aqueous solution containing at least one rare earth element and a fluoride aqueous solution, a Ba concentration is not more than 3.0 mol/liter and a F/Ba molar ratio is not more than 1.

A fourth aspect of the process for producing the inorganic fine grains in the present invention is the process for producing the inorganic fine grains according to the third embodiment, in which the fluoride aqueous solution is $NH_4F$ aqueous solution.

A first aspect of inorganic fine grains in the present invention is inorganic fine grains produced by adding, to a solution containing at least one inorganic compound, a solid matter substantially insoluble in the solution, subjecting the solution to a procedure of promoting crystallization or precipitation to form crystal or precipitate, and separating the resulting crystal or precipitate, in which the solution is a mixture of $BaI_2$ aqueous solution containing at least one rare earth element and a fluoride aqueous solution, a Ba concentration is not more than 3.0 mol/liter and a F/Ba molar ratio is not more than 1, the inorganic fine grains being represented by the following basic composition formula (I), having a hexahedral form and having a volume-average grain size of 1 to 10 μm.

$$BaFI:xLn \qquad (I)$$

wherein
Ln represents at least one of Ce, Pr, Sm, Eu, Tb, Dy, Ho, Nd, Er, Tm and Yb, and
x represents a value of $0<x\leq0.2$.

A second aspect of the inorganic fine grains in the present invention is the inorganic fine grains according to the first aspect, in which the fluoride aqueous solution is an $NH_4F$ aqueous solution.

A third aspect of the inorganic fine grains in the present invention is the inorganic fine grains according to the first aspect, in which an aspect ratio is 0.5 to 2.

A first aspect of a rare earth element-activated barium fluorohalide fluorescent substance in the present invention is a rare earth element-activated barium fluorohalide fluorescent substance which is produced using at least the inorganic fine grains according to the first aspect thereof.

A first aspect of a radiation image conversion panel in the present invention is a radiation image conversion panel in which a rare earth element-activated barium fluorohalide fluorescent substance produced using the inorganic fine grains according to the first aspect thereof is contained in a fluorescent substance layer.

DESCRIPTION OF THE PREFERRED EMBODIMENTS

Figure 1:
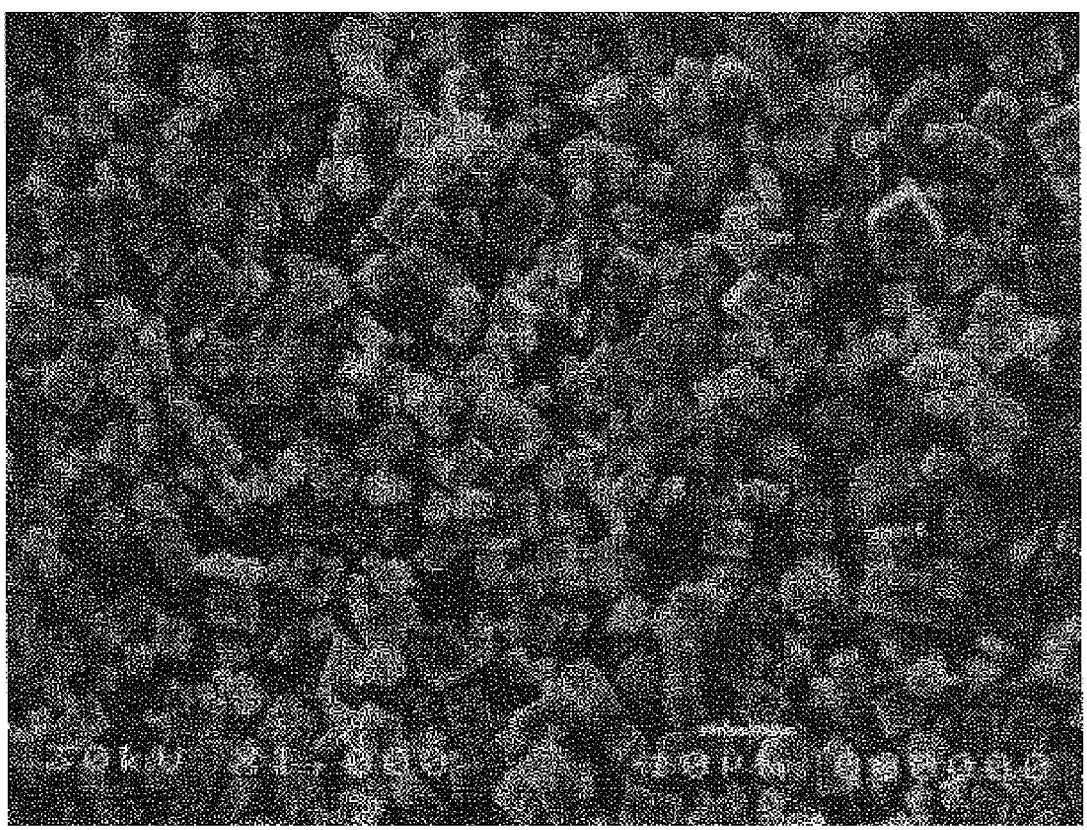
FIG. 1 is an electron micrograph of inorganic fine grains of the present invention obtained in Example 3.

The present invention is described in detail below.

(A) Process for Producing Inorganic Fine Grains

The process for producing inorganic fine grains in the present invention is not particularly limited so long as it is a reaction in a liquid phase for obtaining crystal or precipitate.

First, a solution containing at least one inorganic compound is prepared. Then, a solid matter substantially insoluble in the solution (hereinafter sometimes referred to simply as a "solid matter") is added.

The "solid matter substantially insoluble in the solution" means a solid matter which has a corrosion resistance to the solution and a solvent constituting the solution and of which the component is not eluted in the solution. Further, it refers to a solid matter which is itself not reacted in the procedure of promoting crystallization or precipitation of the solution and of which the component is therefore not eluted in the solution.

The form of the solid matter is not particularly limited, powdery, square, cylindrical, disk-like, spherical, string-like, sheet-like form and the like. The form after the procedure of promoting crystallization or precipitation does not necessarily have to keep the original form unless the component constituting the solid matter is eluted in the solution. It is advisable to determine the grain diameter of the solid matter, as required, according to an amount of the solution and the like. The volume-average grain size corresponding to the spherical form is preferably 0.1 to 30 mm, more preferably 1 to 10 mm. It is also advisable to determine the amount of the solid matter, as required, according to an amount of the solution and the like. It is preferably 5 to 100% by mass, more preferably 10 to 50% by mass.

The solid matter used varies with the procedure of promoting crystallization, precipitation, the solution used or the like. Examples thereof include a zeolite, a Teflon zeolite (manufactured by Chemware), a Teflon lashing, a Teflon ball, a Teflon punching sheet, silica gel, PVDF (polyvinylidene fluoride) pellets, glass beads and a Teflon joint sealant (manufactured by Gore Tex) and the like.

Besides the foregoing solid matters, solid matters made of a fluororesin having a high chemical stability, especially PTFE (polytetrafluoroethylene (trade name: Teflon)) or PVDF (polyvinylidene fluoride), silica alumina and the like are also available.

After the solid matter is added to the solution, the resulting solution is subjected to the procedure of promoting crystallization or precipitation to form crystal or precipitate.

As the procedure of promoting crystallization or precipitation, a concentration method, a precipitation method and the like are listed.

The concentration method is a method in which a solution is at least one of treated under reduced pressure and heated to precipitate crystal. For example, it refers to a method in which a sodium chloride aqueous solution is used as the solution, and this is supersaturated through heating and the like to precipitate sodium chloride crystal.

The precipitation method is a method in which such a solution (substance) as to form a substance having a low solubility is added to a material dissolved in a solution to form a precipitate. For example, it refers to a method in which a barium salt aqueous solution is used as the solution, a sulfate compound is added thereto as a precipitating agent, and heating and the like is conducted as required to obtain a precipitate of barium sulfate. Further, the precipitation method includes a method in which an activator and a raw material of a fluorescent substance are co-precipitated to obtain a precipitate and a method in which $Y_2O_3$ and $Eu_2O$ are dissolved with hydrochloric acid and co-precipitated as an oxalate with the addition of oxalic acid to obtain a precipitate as a raw material of a $Y_2O_2S:Eu$ fluorescent substance. It can be applied to the process for producing the inorganic fine grains in the present invention.

In combination with the procedure of promoting crystallization or precipitation, treatment under at least one of reduced pressure and heat treatment, treatment of removing vapor on a liquid surface and the like by suction, blowing of dry air or the like may be used.

The crystal or the precipitate obtained by the procedure of promoting crystallization or precipitation is separated from the solution by a known method such as filtration (suction filtration or pressure filtration), centrifugation or the like. The separated crystal or the precipitate is subjected to washing, drying, classification and the like, as required, to form the inorganic fine grains.

The process for producing the inorganic fine grains in the present invention is preferably applied to a process for producing a rare earth element-activated barium fluoroiodide grains. The application of the process for producing the inorganic fine grains in the present invention to a process for producing a rare earth element-activated barium fluoroiodide grains is described below.

First, a $BaI_2$ aqueous solution containing at least one rare earth element as an activator is mixed with a fluoride aqueous solution.

Examples of the rare earth element include Ce, Pr, Sm, Eu, Gd, Tb, Dy, Pr, Ho, Nd, Er, Tm and Yb. Eu and Ce are preferable. The content of the activator in the $BaI_2$ aqueous solution is preferably 0.0001 to 0.6 mol/liter, more preferably 0.001 to 0.1 mol/liter.

Further, for adjusting properties and the like of the final rare earth element-activated barium fluoroiodide grains, an additive (compound) containing an alkali metal, an additive (compound) containing an alkaline earth metal except Ba, a small amount of acid, ammonia, water-soluble polymer and water-insoluble metal oxide fine powder and the like may be added.

Examples of the additive (compound) containing the alkali metal includes salts (halide, nitrate, nitrite, acetate and the like) of Li, Na, K, Rb and Cs. In view of the reduction of impurities in the resulting grains, a halide containing a halogen element (F or I) incorporated in the final barium fluoroiodide is preferable. The amount of the additive containing the alkali metal is adjusted according to a necessary amount for the final composition.

Examples of the additive (compound) containing the alkaline earth metal except Ba include salts (halide, nitrate, nitrite, acetate and the like) of Ca, Sr and the like. In view of the reduction of impurities in the resulting grains, a halide containing a halogen element incorporated in the final barium fluoroiodide is preferable. The amount of the additive containing the alkaline earth metal except Ba may be adjusted according to a necessary amount for the final composition. It is preferably 20 to 5,000 ppm, more preferably 50 to 2,000 ppm in a reaction mother liquor.

Moreover, the fluoride concentration in the fluoride aqueous solution is preferably 1 to 10 mol/liter. As the fluoride, it is preferable to use ammonium fluoride ($NH_4F$), alkali metal fluoride (LiF, NaF, KF or the like) and alkaline earth metal fluoride ($MgF_2$, $CaF_2$, $SrF_2$, $BaF_2$ or the like which may be in the form of a slurry). Of these, ammonium fluoride ($NH_4F$) is more preferable.

When the $BaI_2$ aqueous solution is mixed with the fluoride aqueous solution, the Ba concentration is preferably not more than 3.0 mol/liter, more preferably 2.0 to 2.6 mol/liter. When it exceeds 3.0 mol/liter, the crystallization reaction occurs too early, and the resulting grain form might not be a hexahedron having an aspect ratio (0.5 to 2.0, preferably 0.8 to 1.5) to be described later.

It is preferable that the $BaI_2$ aqueous solution is mixed with the fluoride aqueous solution so that the F/Ba molar ratio is not more than 1. When the F/Ba ratio exceeds 1, precipitation of barium fluoride ($BaF_2$) is accelerated, and it might be incorporated into BaFI grains formed. It is more preferably 0.4 to 0.9.

After the mixing, the solid matter substantially insoluble in this solution is added. The meaning of the "solid matter substantially insoluble" is as described as earlier. As the solid matter, zeolite, a Teflon zeolite (manufactured by Chemware), a Teflon lashing, a Teflon ball, a Teflon punching sheet, silica gel, PVDF (polyvinylidene fluoride) pellets, glass beads, a Teflon joint sealant (manufactured by Gore Tex), alumina and the like are preferable among those listed above.

The solid matter may be added to either the $BaI_2$ aqueous solution containing at least one rare earth element or the fluoride aqueous solution before mixing them.

After the addition of the solid matter, the procedure of promoting crystallization or precipitation is conducted to obtain the crystal or the precipitate made of the inorganic fine grains in the hexahedral form having the volume average grain size of not more than 10 μm. The onset of the form selectivity by the solid matter is unclear in many points. It is presumable because a catalytic activity is exhibited by pores of the solid matter, concave and convex on the surface of the solid matter or the substituent present on the surface or the like.

The hexahedral form (hereinafter sometimes referred to simply as a "hexahedron") in the present invention refers to a rectangular form or a cubic form of which the aspect ratio is 0.5 to 2.0, preferably 0.8 to 1.5.

When the inorganic fine grains are barium fluorohalide crystal, the crystal belongs to a PbFCl (lead fluorochloride)-type tetragonal system. In this crystal system, atomic arrangements of an a axis and a b axis are equivalent, but that of a c axis is different. Accordingly, the aspect ratio of the crystal grains in this system is usually represented by a ratio (L'/L) of a length (L) of a side corresponding to the c axis to a length (L') of a side corresponding to the a axis or the b axis. That is, when the aspect ratio is closer to 1, the form is a cubic form. When it is smaller than 1, the form is a tabular form. When it is larger than 1, the form is a columnar form.

L and L' can easily be measured with an electron microscope. For example, it is advisable that the "aspect ratio" is obtained by calculating aspect ratios of respective crystal grains observed in an area of 5 cm×5 cm of an electron micrograph (1,000× magnification) and averaging them.

After the addition of the solid matter, a concentration or precipitation method is preferably used as the procedure of promoting crystallization or precipitation. Further, a reaction rate can be increased by providing reduced pressure of, preferably, 100 hPa to 900 hPa, more preferably, 200 hPa to 600 hPa with an aspirator and the like. When it is less than 100 hPa, a reaction solution is sucked by bumping. When it exceeds 900 hPa, the effect of reduced pressure is little brought forth to decrease the reaction rate.

The temperature in the procedure of promoting crystallization or precipitation is preferably 20 to 100° C., more preferably 40 to 80° C. When it is less than 20° C., the reaction proceeds slowly. Meanwhile, when it exceeds 100° C., boiling tends to occur, and the form of the resulting grains might not be fixed.

The thus-obtained precipitate is separated from the solution after the reaction by a known method such as filtration, centrifugation or the like.

After the separation, known washing, drying, classification and the like are conducted, as required, to produce the rare earth element-activated barium fluoroiodide grains which are inorganic fine grains.

The washing is conducted using an alcohol and the like such as 2-propanol and the like as a solvent. The drying may be air drying, hot air drying, force-drying with an oven or vacuum drying.

The thus-obtained rare earth element-activated barium fluoroiodide grains are, for example, represented by the following basic composition formula (I), have a cubic form, and have a volume-average grain size of 1 to 10 μm (preferably 2 to 7 μm).

BaFI:xLn    (I)

wherein
  Ln represents at least one of Ce, Pr, Sm, Eu, Tb, Dy, Ho, Nd, Er, Tm and Yb, and
  x represents a value of $0 < x \leq 0.2$.

Consequently, when the fluorescent substance produced from the rare earth element-activated barium fluoroiodide grains by the process for producing the rare earth element-activated barium fluorohalide fluorescent substance to be described later is used in the radiation image conversion panel, the graininess is improved, and the scattering of excitation light is controlled, making it possible to reduce deterioration of an image quality.

(B) Rare Earth Element-Activated Barium Fluorohalide Fluorescent Substance

The rare earth element-activated barium fluoroiodide grains can be used as, for example, a raw material for production of a stimulation fluorescent substance (rare earth element-activated barium fluorohalide fluorescent substance) represented by the following basic composition formula (II).

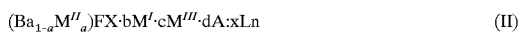

$(Ba_{1-a}M''_a)FX \cdot bM' \cdot cM''' \cdot dA:xLn$    (II)

wherein
  M'' represents at least one alkaline earth metal selected from the group consisting of Sr, Ca and Mg, M$^I$ represents at least one alkali metal selected from the group consisting of Li, Na, K, Rb and Cs, M$^{III}$ represents a compound of at least one trivalent metal selected from the group consisting of Al, Ga, In, Tl, Sc, Y, Cd and Lu (except Al$_2$O$_3$), X represents at least one halogen selected from the group consisting of Cl, Br and I, Ln represents at least one rare earth element selected from the group consisting of Ce, Pr, Sm, Eu, Gd, Tb, Dy, Ho, Nd, Er, Tm and Yb, A represents at least one metal oxide selected from the group consisting of Al$_2$O$_3$, SiO$_2$ and ZrO$_2$, and a, b, c, d and x represent values of $0 \leq a \leq 0.3$, $0 \leq b \leq 2$, $0 \leq c \leq 2$, $0 \leq d \leq 0.5$ and $0 < x \leq 0.2$ respectively.

Further, the form of grains of the stimulation fluorescent substance includes a rectangular form, a regular hexahedral form, a regular octahedral form, an intermediate polyhedral form thereof and a tetradecahedral form and the like. Of these, a tetradecahedral form is preferable in that in the production of a radiation image conversion panel, a less directional arrangement is provided in a fluorescent substance layer, undesirable lateral spread of excitation light and stimulation light is reduced and a sharpness of a radiation reproduction image obtained is improved.

A process for producing the rare earth element-activated barium fluorohalide fluorescent substance is described below.

The rare earth element-activated barium fluorohalide fluorescent substance (hereinafter sometimes referred to simply as a "fluorescent substance") is produced, as described below, from [Fluorescent substance raw materials] through steps, [Step of mixing raw materials], [Burning step], [Cooling step] and, as required, [Other steps]. However, the process is not limited thereto.

[Fluorescent Substance Raw Materials]

With respect to fluorescent substance raw materials, crystal grains of the rare earth element-activated barium fluoroiodide produced by the foregoing method of the present invention are used. Other raw materials are not particularly limited, and those obtained by any known methods are available.

As fluorescent substance raw materials, the following raw materials (1) to (5) can be listed.

(1) rare earth element-activated barium fluoroiodide produced by the process for producing the inorganic fine grains in the present invention. Further, as required, at least one barium halide selected from the group consisting of BaF$_2$, Ba Cl$_2$, BaBr$_2$, BaI$_2$, BaFBr, BaFI and BaFCl.

(2) at least one alkaline earth metal halide selected from the group consisting of CaF$_2$, CaCl$_2$, CaBr$_2$, CaI$_2$, SrF$_2$, SrCl$_2$, SrBr$_2$, SrI$_2$, MgF$_2$, MgCl$_2$, MgBr$_2$ and MgI$_2$.

(3) at least one alkali metal halide selected from the group consisting of CsCl, CsBr, CsI, NaCl, NaBr, NaI, KCl, KBr, KI, RbCl, RbBr, RbI, RbF, CsF, NaF, KF, LiF, LiCl, LiBr and LiI.

(4) at least one metal oxide selected from the group consisting of Al$_2$O$_3$, SiO$_2$ and ZrO$_2$.

(5) at least one compound selected from the group consisting of compounds (halide, oxide, nitrate, sulfate and the like) of rare earth elements (Ce, Pr, Sm, Eu, Gd, Tb, Dy, Pr, Ho, Nd, Er, Tm and Yb). The raw material (5) is not indispensable, and when it is added, its amount may be small.

Further, an ammonium halide (NH$_4$X' in which X' represents F, Cl, Br or I) and the like may be used as a flux.

[Step of Mixing Raw Materials]

Desired raw materials are optionally selected from among the foregoing raw materials (1) to (5), and stoichiometric amounts thereof are measured according to a desired composition ratio. They are mixed to prepare a mixture of raw materials of a fluorescent substance.

A method for preparing the mixture of the fluorescent substance raw materials can properly be selected from among known mixing methods. For example, the mixture of the fluorescent substance raw materials may be prepared by the following methods (i) to (iv).

(i) Method in which the amounts of the fluorescent substance raw materials (1) to (5) are measured and they are only mixed.

(ii) Method in which the amounts of the fluorescent substance raw materials (1) to (4) are measured and mixed, the mixture is heated at a temperature of not less than 100° C. for a few hours, and the heat-treated product is mixed with the fluorescent substance raw material (5).

(iii) Method in which the fluorescent substance raw materials (1) to (5) are mixed, and the mixture is heated at a temperature of not less than 100° C. for a few hours.

(iv) Method in which the fluorescent substance raw materials (1) to (4) are mixed in a state of a suspension, the suspension is dried at an elevated temperature, preferably 50 to 200° C. by reduced pressure drying, vacuum drying, spray drying or the like, and the resulting dry product is mixed with the fluorescent substance raw material (5).

Further, preferable variations of the method (iv) can include a method (iv-2) in which the fluorescent substance raw materials (1) to (5) are mixed in a state of a suspension, and the suspension is dried, a method (iv-3) in which the suspension containing the fluorescent substance raw materials (1) and (5) is heated at a temperature of, preferably 50 to 200° C., and then dried at an elevated temperature by reduced pressure drying, vacuum drying, spray drying or the like, and the resulting mixture is mixed with the fluorescent substance raw materials (2) to (4), and a method (iv-4) in which, when conducting burning at least twice, the fluorescent substance raw materials (1) and (2) are mixed in a state of a suspension, the fluorescent substance raw materials (3) and (4) are added after the primary burning, the suspension is dried at an elevated temperature, preferably 50 to 200° C. by reduced pressure drying, vacuum drying, spray drying or the like, and the resulting dry product is mixed with the fluorescent substance raw material (5), and the like.

Also available is a method for preparing a rare earth element-activated alkaline earth metal fluorohalide stimulation fluorescent substance of a tetradecahedral form with a grain form and a grain aspect ratio controlled as described in JP-A Nos. 7-233369 and 10-195431, namely, a method (v) using, in addition to the methods (i) to (iv-4) for preparing the mixture of the fluorescent substance raw materials, a procedure capable of imparting shear force in mixing the fluorescent substance raw materials, or a method (vi) using a procedure capable of controlling conditions such as timing of addition and mixing of the fluorescent substance raw materials and the like.

A mixing unit used for the mixing in the methods (v) and (vi) can properly be selected from among known mixing units such as various mixers, a V-shaped blender, a ball mill, a rod mill and the like.

The following various additives can be added for improving an amount of stimulation luminescence, an erasability and the like in producing the fluorescent substance.

Examples thereof can include B described in JP-A No. 57-23673, As described in JP-A No. 57-23675, tetrafluoroborate compounds described in JP-A No. 59-27980, hexafluoride compounds described in JP-A No. 59-47289, transition metals such as V, Cr, Mn, Fe, Co, Ni and the like described in JP-A No. 59-56480 and BeX"$_2$ (in which X" represents at least one halogen atom selected from the group consisting of F, Cl, Br and I) described in JP-A No. 59-75200.

When the additives are added, they are added and mixed either in measuring the amounts of the fluorescent substance raw materials and mixing the same or before burning.

[Burning Step]

The mixture of the fluorescent substance raw materials is filled in a heat-resistant container such as a quartz boat, an alumina crucible, a quartz crucible, a core tube or the like, and placed in a core of an electric furnace to conduct burning.

The burning temperature is preferably 600 to 1,000° C., more preferably 700 to 850° C. When the burning temperature is less than 600° C., generation of F+as a source of diffusion or stimulation of an activator element in host crystal might be insufficient. When it exceeds 1,000° C., host crystal might be melted.

The burning time varies with the amount of the mixture of the fluorescent substance raw materials, the burning temperature and the temperature of drawing from the furnace. Generally, it is preferably 0.5 to 6 hours, more preferably 1 to 3 hours.

When the burning time is less than 0.5 hour, generation of $F^+$ as a source of diffusion or stimulation of an activator element in host crystal might be insufficient. Even when it exceeds 6 hours, the properties of the fluorescent substance are little changed, and a productivity might be decreased.

An atmosphere in the core tube at the time of burning is preferably an atmosphere using a neutral or slightly oxidizing gas.

Examples of the neutral gas include inert gases such as He, Ne, Ar, $N_2$ and the like.

The slightly oxidizing gas refers to a weakly oxidizing gas in which 100 to 100,000 ppm, preferably 150 to 50,000 ppm of oxygen is contained in a unit volume of neutral gas. For example, a weakly acidic gas in which oxygen at the foregoing concentration is contained in an inert gas such as He, Ne, Ar, $N_2$ or the like is mentioned.

Further, it is preferable that a slow cooling step is provided before a cooling step to be described later as a post treatment after burning the mixture of the fluorescent substance raw materials at a fixed temperature as described above.

The slow cooling step may be conducted immediately after burning the mixture of the fluorescent substance raw materials. It is preferable that this step is conducted after the lapse of a fixed time while the removal and the substitution of the atmosphere are conducted at a fixed temperature.

In the slow cooling, the temperature is decreased upon controlling the temperature at a moderate temperature gradient until the temperature reaches a predetermined temperature from the start-up. Especially in view of improving the luminescence of the stimulation fluorescent substance, it is preferable that the slow cooling is conducted to a temperature which is lower than a temperature in completing the burning by 20 to 200° C. at a rate of temperature fall of 0.2 to 5° C./min.

[Cooling Step]

The cooling in the cooling step may be conducted by a method in which a product is allowed to stand to decrease a temperature or a method in which a temperature is forcibly decreased while being controlled with a cooler. However, for shortening a cooling time and stably producing a stimulation fluorescent substance having satisfactory properties, a method in which cooling is conducted by controlling a temperature to a desired temperature is preferable.

[Other Steps]

Further, the stimulation fluorescent substance after the burning can be subjected to, as required, general steps such as a washing step, a drying step, a screening step and the like.

The rare earth element-activated barium fluorohalide fluorescent substance in a powdery state can be obtained by the burning. The resulting powdery fluorescent substance may be subjected to, as required, general steps in production of a fluorescent substance, such as washing, drying, screening and the like.

(C) Radiation Image Conversion Panel

The thus-obtained rare earth element-activated barium fluorohalide fluorescent substance can be used as a stimulation fluorescent substance contained in a fluorescent substance layer of a radiation image conversion panel. The radiation image conversion panel is described below.

The radiation image conversion panel basically comprises a substrate and a fluorescent substance layer formed thereon. The fluorescent substance layer comprises a binder for supporting the stimulation fluorescent substance in a dispersed state. The fluorescent substance layer can be formed on the substrate by, for example, the following method.

First, the grains of the barium fluorohalide fluorescent substance and the binder are added to an appropriate solvent, and these are fully mixed to form a coating solution in which the fluorescent substance grains are uniformly dispersed in the binder solution.

Typical examples of the binder of the fluorescent substance layer can include proteins such as gelatin and the like, polysaccharides such as dextran and the like, natural macromolecular materials such as gum arabic, and synthetic macromolecular materials such as polyvinyl butyral, polyvinyl acetate, nitrocellulose, ethyl cellulose, vinylidene chloride-vinyl chloride copolymer, polyalkyl (meth) acrylate, vinyl chloride-vinyl acetate copolymer, polyurethane, cellulose acetate butyrate, polyvinyl alcohol, linear polyester and the like. Of these binders, nitrocellulose, polyurethane, linear polyester, polyalkyl (meth) acrylate, a mixture of nitrocellulose and linear polyester and a mixture of nitrocellulose and a polyalkyl (meth) acrylate are especially preferable. These binders may be those crosslinked with a crosslinking agent.

Examples of the solvent for forming the coating solution can include lower alcohols such as methanol, ethanol, n-propanol, n-butanol and the like; chlorine-containing hydrocarbons such as methylene chloride, ethylene chloride and the like; ketones such as acetone, methyl ethyl ketone, methyl isobutyl ketone and the like; esters of lower fatty acids and lower alcohols such as methyl acetate, ethyl acetate, butyl acetate and the like; ethers such as dioxane, ethylene glycol monoethyl ether, ethylene glycol monomethyl ether and the like; and mixtures thereof.

The mixing ratio of the binder and the fluorescent substance in the coating solution varies with the properties of the desired radiation image conversion panel and the type of the fluorescent substance and the like. Generally, it is preferably 1:1 to 1:100 (weight ratio), more preferably 1:8 to 1:40 (weight ratio).

The coating solution may contain various additives such as a dispersing agent for improving a dispersibility of the fluorescent substance grains in the coating solution, a plasticizer for improving an adhesion between the binder and the fluorescent substance grains in the fluorescent substance layer after formation and the like. Examples of the dispersing agent used for this purpose can include phthalic acid, stearic acid, caproic acid and a lipophilic surfactant. Examples of the plasticizer can include phosphate esters such as triphenyl phosphate, tricresyl phosphate, diphenyl phosphate and the like; phthalate esters such as diethyl phthalate, dimethoxyethyl phthalate and the like; glycolate esters such as ethylphthalylethyl glycolate, butylphthalylbutyl glycolate and the like; polyesters of polyethylene glycol and aliphatic dibasic acids, such as polyester of triethylene glycol and adipic acid, polyester of diethylene glycol and succinic acid and the like; and the like.

The thus-obtained coating solution containing the fluorescent substance grains and the binder is then uniformly coated on the surface of the substrate to form a film of the coating solution. This coating procedure can be conducted by an ordinary coating unit such as a doctor blade, a roll coater, a knife coater or the like.

After the formation of the film, the film is dried to complete formation of the fluorescent substance layer on the substrate. The thickness of the fluorescent substance layer varies with the properties of the desired radiation image conversion panel, the type of the fluorescent substance, the mixing ratio of the binder and the fluorescent substance and the like. It is usually 20 μm to 1 mm. This layer thickness is preferably 50 to 500 μm.

The fluorescent substance layer is not necessarily formed by directly coating the coating solution on the substrate as noted above. For example, it is also possible that the coating solution is coated separately on a glass plate, a metal plate or a sheet (temporary substrate) such as a plastic sheet and the like, and dried to form a fluorescent substance layer, and the layer is then peeled off from the temporary substrate and pressed on the substrate, or the substrate and the fluorescent substance layer are adhered using an adhesive and the like.

The fluorescent substance layer may be a single layer or a laminate of at least two layers. In case of the laminate, at least one layer can be a layer containing the barium fluorohalide fluorescent substance. Further, in both of the single layer and the laminate, another stimulation fluorescent substance can be used in combination with the barium fluorohalide fluorescent substance.

The substrate can optionally be selected from various materials used as a substrate of sensitization sheet in ordinary radiography or various known materials as a substrate of a radiation image conversion panel. Examples of such materials can include plastic films such as cellulose acetate, polyester, polyethylene terephthalate, polyamide, polyimide, triacetate, polycarbonate and the like, metallic sheets such as an aluminum foil, an aluminum alloy foil and the like, plain paper, baryta paper, resin-coated paper, pigment paper containing pigment such as titanium dioxide and the like, paper sized with polyvinyl alcohol and the like, and the like. However, in consideration of characteristics and handling of the radiation image conversion panel as an information recording material, the especially preferable material of the substrate is a plastic film. The plastic film may contain light-absorbing substance such as carbon black and the like or light-reflecting substance such as titanium dioxide and the like. The former is a substrate suited for a radiation image conversion panel having a high sharpness, and the latter is a substrate suited for a radiation image conversion panel having a high sensitivity.

In a known radiation image conversion panel, for enhancing an adhesion between a substrate and a fluorescent substance layer or improving a sensitivity or an image quality (sharpness and graininess) as a radiation image conversion panel, an adhesion-imparting layer is formed on a surface of a substrate on the side where a fluorescent substance layer is formed by coating at least one macromolecular material such as gelatin or the like, a light-reflecting layer made of a light-reflecting material such as titanium dioxide or the like and a light-absorbing layer made of a light-absorbing substance such as carbon black or the like is formed thereon.

Moreover, as described in JP-A No. 58-200200, fine surface irregularities may uniformly be formed on a surface of a substrate on the side of a fluorescent substance layer (in case of forming an adhesion-imparting layer, a light-reflecting layer, a light-absorbing layer or the like on a surface of a substrate on the side of a fluorescent substance layer, the outer surface) for improving a sharpness of the resulting image.

In an ordinary radiation image conversion panel, a transparent protecting layer for protecting a fluorescent substance layer physically and chemically is formed on a surface of a fluorescent substance layer opposite to the side in contact with a substrate.

The transparent protecting layer can be formed by a method in which a solution formed by dissolving a transparent macromolecular substance in an appropriate solvent is coated on a surface of a fluorescent substance layer, examples of the transparent macromolecular substance being cellulose derivatives such as cellulose acetate, nitrocellulose and the like and synthetic macromolecular materials such as polymethyl methacrylate, polyvinyl butyral, polyvinyl formal, polycarbonate, polyvinyl acetate, vinyl chloride-vinyl acetate copolymer and the like. Alternatively, it can also be formed by a method in which a transparent thin film separately formed from polyethylene terephthalate, polyethylene, polyvinylidene chloride, polyamide or the like is adhered to a surface of a fluorescent substance layer using an appropriate adhesive. A thickness of the thus-formed transparent protecting layer is preferably approximately 3 to 20 μm.

As described in JP-A No. 55-163500 and 57-96300, the radiation image conversion panel may be colored with a colorant to improve a sharpness of an image obtained by coloration. Further, as described in JP-A No. 55-146447, a white powder may be dispersed in the fluorescent substance layer for the same purpose.

EXAMPLES

The present invention is illustrated specifically below by referring to Examples. However, the present invention is not limited to these Examples.

Example 1

An aqueous solution (150 ml) containing 4 mol/liter of $BaI_2$ was added to a 300 ml separable beaker, and 3 ml of a solution containing 0.1 mol/liter of $EuI_3$ and 47 ml of water were further added thereto. With stirring, 50 ml of an aqueous solution containing 6 mol/liter of $NH_4F$ was added to form a mixed solution which was maintained at 80° C.

To the mixed solution was added 50 g of a Teflon zeolite (manufactured by Chemware: boiling stone; a material, a form and the like are shown in Table 1) as a solid matter. While the inside of the separable beaker was exhausted with an aspirator, the reaction was conducted for 2 hours with stirring to form a precipitate of BaFI:Eu grains (rare earth element-activated barium fluoroiodide grains) as inorganic fine grains.

Since excessive exhaustion results in bumping, this reaction was conducted under reduced pressure of 533 hPa (40 cmHg) by providing a clearance in an exhaust tube portion.

After the reaction, the Teflon zeolite was separated with a stainless mesh having an opening of 1 mm, and the precipitate was further separated through suction filtration with a filter paper. The precipitate separated was uniformly sprayed 300 ml of IPA (isopropyl alcohol) to wash, and vacuum-dried at 150° C. for 2 hours to obtain 83 g of BaFI:Eu grains.

With respect to the resulting BaFI:Eu grains, (1) observation of a form, (2) measurement of an aspect ratio and (3) measurement of a volume average grain diameter were conducted as follows.

(1) Observation of a Form

The form of the BaFI:Eu grains was observed from a photograph obtained using a scanning electron microscope (JSM-5400LV, manufactured by JEOL Ltd.). It was found from the photograph that the BaFI:Eu grains had a cubic form.

(2) Measurement of an Aspect Ratio

The aspect ratio of the BaFI:Eu grains was measured by obtaining a length (L') of a side corresponding to an a axis or a b axis and a length (L) of a side corresponding to a c axis on each of the BaFI:Eu grains from a photograph (range: 5 cm×5 cm) obtained with the foregoing scanning electron microscope (1,000× magnification), calculating L'/L ratios thereof and averaging the same.

In this Example, the aspect ratio of the BaFI:Eu grains was 1. It was found, as in the observation of the form, that the BaFI:Eu grains had a cubic form.

(3) Measurement of a Volume-Average Grain Size

The volume-average grain size was measured by a volume standard mode using a laser diffraction-type grain size distribution measuring device (LA-500 manufactured by Horiba Ltd.). The volume-average grain size of the resulting BaFI:Eu grains was 6.5 μm.

BaFBr:Eu tetradecahedral grains (volume-average grain size approximately 5 μm) were produced by the method described in Example 1 of JP-A No. 7-233369. The BaFBr:Eu grains and the BaFI:Eu grains were fully mixed with a mixer at a Br to I composition ratio (molar ratio) of 85:15 to form a mixture. At this time, 0.5% by weight of alumina fine grains was added for preventing sintering in burning.

100 g of the thus-formed mixture was charged into a quartz boat, and burned using a burning furnace having a quartz core tube. The burning was conducted in a trace oxygen atmosphere at a burning temperature of 850° C. for a burning time of 2 hours. After the burning, the core tube was withdrawn from a heater portion, and cooled to room temperature while being vacuum-exhausted. After the cooling, 100 g of methanol was added, and the mixture was stirred for 3 hours. Then, the product was loosened through a nylon mesh having an opening of 20 μm, and classified. The product passed through the mesh was subjected to solid-liquid separation with a filter paper, and dried with hot air to obtain a rare earth element-activated barium fluorohalide fluorescent substance (BaF(Br$_{0.85}$I$_{0.15}$):Eu grains) as a stimulation fluorescent substance.

Next, a step of producing a radiation image conversion panel is described.

The barium fluorohalide fluorescent substance (356 g), 15.8 g of polyurethane resin (Desmolac 4125 manufactured by Sumitomo Bayer Urethane K.K.) and 2.0 g of bisphenol A-type epoxy resin were added to methyl ethyl ketone as a solvent, and dispersed with a propeller mixer to form a coating solution having a viscosity of 3.0 Pa·s. This coating solution was coated on a polyethylene terephthalate film having an undercoat with a doctor blade, and then dried at 100° C. for 15 minutes to form a fluorescent substance layer having a thickness of 200 μm.

Subsequently, 70 g of a fluoroolefin-vinyl ether copolymer (Lumiflon LF100 manufactured by Asahi Glass Company, Ltd.) as a fluororesin, 25 g of an isocyanate (Desmodur Z4370 manufactured by Sumitomo Bayer Urethane K. K.) as a crosslinking agent, 5 g of a bisphenol A-type epoxy resin and 10 g of a silicone resin fine powder (KMP-590 manufactured by The Shin-etsu Chemical Industry Co., Ltd., volume-average grain size 1.2 μm) were added to a toluene-isopropyl alcohol (1:1) solvent mixture to form a coating solution.

This coating solution was coated on the fluorescent substance layer previously formed above using a doctor blade, then heat-treated at 120° C. for 30 minutes for thermosetting, and dried to form a protecting layer having a thickness of 10 μm. Thus, a radiation image conversion panel having a stimulation fluorescent substance layer 200 μm in thickness was produced.

Examples 2 to 7

Inorganic fine grains were produced as in Example 1 except that materials shown in Table 1 were used instead of the Teflon zeolite in Example 1. Further, a fluorescent substance was produced as in Example 1. The inorganic fine grains were subjected to the observation of the form, the measurement of the aspect ratio and the measurement of the volume-average grain size as in Example 1. The results are shown in Table 2.

An electron micrograph (1,000× magnification) of the BaFI:Eu grains obtained in Example 3 as inorganic fine grains is shown in FIG. 1. From FIG. 1, it was identified that all of the grains (crystal) had a grain size of 10 μm or less and had a cubic form.

Further, radiation image conversion panels were produced under the same conditions as in Example 1 using the fluorescent substances obtained in respective Examples.

Comparative Example 1

A mixed solution was formed as in Example 1 except that an ordinary beaker was used instead of the separable beaker. A precipitate of inorganic fine grains (BaFI:Eu grains) was formed by spontaneous evaporation (5 hours) without adding the solid matter to the mixed solution. In the same manner as in Example 1, the precipitate was separated from the mixed solution, washed, and dried to form inorganic fine grains. Further, a fluorescent substance was produced as in Example 1. The inorganic fine grains were subjected to the observation of the form, the measurement of the aspect ratio and the measurement of the volume-average grain size as in Example 1. The results are shown in Table 2.

Further, a radiation image conversion panel was produced under the same conditions as in Example 1 using the fluorescent substance obtained in this Comparative Example. (Comparative Example 2) Inorganic fine grains were produced as in Example 1 except that the solid matter was not added. Further, a fluorescent substance was produced as in Example 1. The inorganic fine grains were subjected to the observation of the form, the measurement of the aspect ratio and the measurement of the volume-average grain size as in Example 1. The results are shown in Table 2.

Further, a radiation image conversion panel was produced under the same conditions as in Example 1 using the fluorescent substance obtained in this Comparative Example.

With respect to the radiation image conversion panels produced in Examples 1 to 7 and Comparative Examples 1 and 2, evaluation of an image quality was conducted in the following manner.

First, X-rays were applied (tube voltage: 80 kVp, dose: 2.58×10$^{-7}$ (C/kg)(=1 mR)) from the side of the fluorescent substance layer formed on each of the radiation image conversion panels, and a laser beam of 660 nm was then applied to read an image information. Regarding the image quality of the image information read, DQE (detection quantum efficiency) was calculated. The value obtained in Comparative Example 1 was rated as 100, and relative values obtained in Examples 1 to 7 and Comparative Example 2 were compared. The results are shown in Table 2.

Incidentally, DQE was calculated by a method described in "Lifetime text 1 Clinical Imaging 1 pp. 103–104" (compiled by The Japan Association of Radiological Technologists (1991), Maguburosu Shuppan).

TABLE 1

| | Name of a solid matter | Maker | Material of a solid matter | Form of a solid matter | size of a solid matter | Surface condition of a solid matter |
|---|---|---|---|---|---|---|
| Example 1 | Teflon zeolite | Chemware | PTFE | angular indefinite form | 5–10 mm | many spherical protrusions of 1.2 μm |
| Example 2 | Teflon lashing | Chemware | TVDF | hollow cylindrical form | height 6 mm | no (smooth) |
| Example 3 | PVDF | Aldrich | PVDF | disk form | diameter 6 mm thickness 2 mm | no (smooth) |
| Example 4 | silica gel | Ikeda Rika K.K. | $SiO_2$ | spherical form | diameter 3–4 mm | having pores of submicron |
| Example 5 | boiling tips | Kanto Kagaku K.K. | $SiO_2 + Al_2O_3$ | indefinite small stone form | ca. 6 mm | having pores of submicron (containing water of crystallization) |
| Example 6 | Teflon punching sheet | Ikeda Rika K.K. | PTFE | porous sheet form | Sheet 3 mm in thickness and 3 mm in pore diameter is cut to a square of 5 mm. | no (smooth) |
| Example 7 | Gore Tex joint sealant | Gore Tex | PTFE | string form | diameter 6.4 mm, length 5 mm | fine fibers of submicron |

PTFE: polytetrafluoroethylene
PVDF: polyvinylidene fluoride

TABLE 2

| | Form | Aspect ratio | Volume-average grain size (μm) | Image quality (relative DQE) |
|---|---|---|---|---|
| Example 1 | cubic | 1.0 | 6.5 | 110 |
| Example 2 | cubic | 1.1 | 6.5 | 108 |
| Example 3 | cubic | 1.0 | 5.3 | 112 |
| Example 4 | cubic | 1.1 | 7.2 | 107 |
| Example 5 | cubic | 1.0 | 6.8 | 105 |
| Example 6 | cubic | 1.2 | 7.5 | 107 |
| Example 7 | cubic | 1.1 | 6.0 | 110 |
| Comparative Example 1 | cubic | 1.3 | 15.3 | 100 |
| Comparative Example 2 | tabular | 0.2 | 17.5 | 95 |

In Examples 1 to 7, the solid matter was added in the production of the inorganic fine grains (rare earth element-activated barium fluoroiodide grains). Accordingly, the inorganic fine grains in a cubic form having the volume-average grain size of not more than 10 μm could be produced. Further, the image quality (relative DQE) of the radiation image conversion panel produced by using the inorganic fine grains was excellent in comparison with Comparative Examples 1 and 2.

According to the process for producing the inorganic fine grains in the present invention, the inorganic fine grains in a definite form having a small grain size can be produced. Further, the radiation image conversion panel produced from the rare earth metal-activated barium fluorohalide fluorescent substance using the inorganic fine grains is excellent in image quality.

What is claimed is:

1. A process for producing inorganic fine grains comprising the steps of:
    adding to a solution, which includes at least one inorganic compound, a solid matter which is substantially insoluble in the solution;
    promoting one of crystallization and precipitation in the solution, to produce one of crystal and precipitate; and
    separating out the one of crystal and precipitate,
    wherein the solid matter has a volume-average grain size of 0.1 to 30 mm.

2. The process for producing inorganic fine grains according to claim 1, wherein the solid matter comprises at least a material selected from the group consisting of polytetrafluoroethylene, polyvinylidene fluoride, silica and alumina.

3. A process for producing inorganic fine grains comprising the steps of:
    adding to a solution, which includes at least one inorganic compound, a solid matter which is substantially insoluble in the solution;
    promoting one of crystallization and precipitation in the solution, to produce one of crystal and precipitate; and
    separating out the one of crystal and precipitate,
    wherein the solid matter comprises an addition amount thereof of 5 to 100% by mass relative to the solution.

4. The process for producing inorganic fine grains according to claim 1, wherein the step of promoting one of crystallization and precipitation includes a temperature of 20 to 100° C.

5. A process for producing inorganic fine grains comprising the steps of:
    adding to a solution, which includes at least one inorganic compound, a solid matter which is substantially insoluble in the solution;
    promoting one of crystallization and precipitation in the solution, to produce one of crystal and precipitate; and
    separating out the one of crystal and precipitate,
    wherein the one of crystal and precipitate produced comprises barium fluorohalide.

6. A process for producing inorganic fine grains comprising the steps of:
    adding to a solution, which includes at least one inorganic compound, a solid matter which is substantially insoluble in the solution;
    promoting one of crystallization and precipitation in the solution, to produce one of crystal and precipitate; and separating out the one of crystal and precipitate, wherein the one of crystal and precipitate produced comprises barium fluoroiodide.

7. A process for producing inorganic fine grains comprising the steps of:

adding to a solution, which includes at least one inorganic compound, a solid matter which is substantially insoluble in the solution;

promoting one of crystallization and precipitation in the solution, to produce one of crystal and precipitate; and separating out the one of crystal and precipitate, wherein the solution comprises a mixture of a $BaI_2$ aqueous solution, which contains at least one rare earth element, and a fluoride aqueous solution, a Ba concentration in the solution being not more than 3.0 mol/liter, and a F/Ba molar ratio being not more than 1.

8. The process for producing inorganic fine grains according to claim 7, wherein the at least one rare earth element comprises a rare earth element selected from the group consisting of Ce, Pr, Sm, Eu, Gd, Tb, Dy, Pr, Ho, Nd, Er, Tm and Yb.

9. The process for producing inorganic fine grains according to claim 7, wherein the fluoride aqueous solution comprises a fluoride selected from the group consisting of $NH_4F$, LiF, NaF, KF, $MgF_2$, $CaF_2$, $SrF_2$ and $BaF_2$.

10. The process for producing inorganic fine grains according to claim 7, wherein the fluoride aqueous solution comprises $NH_4F$ aqueous solution.

11. Inorganic fine grains, comprising inorganic fine grains which are represented by the following basic composition formula (I), have a hexahedral form, and have a volume-average grain size of 1 to 10 μm:

$$BaFI:xLn \qquad (I)$$

in which Ln represents at least one element selected from the group consisting of Ce, Pr, Sm, Eu, Tb, Dy, Ho, Nd, Er, Tm and Yb, and x represents a value in the range $0<x\leq 0.2$, wherein the inorganic fine grains are produced by adding, to a solution containing at least one inorganic compound, a solid matter substantially insoluble in the solution, promoting crystallization or precipitation in the solution to produce crystal or precipitate, and separating out the resulting crystal or precipitate, the solution including a mixture of a $BaI_2$ aqueous solution, which contains at least one rare earth element, and a fluoride aqueous solution, a Ba concentration in the solution being not more than 3.0 mol/liter and a F/Ba molar ratio being not more than 1.

12. The inorganic fine grains according to claim 11, wherein the fluoride aqueous solution comprises $NH_4F$ aqueous solution.

13. The inorganic fine grains according to claim 11, wherein the inorganic fine grains comprise an aspect ratio of 0.5 to 2.

14. A rare earth element-activated barium fluorohalide fluorescent substance, wherein the rare earth element-activated barium fluorohalide fluorescent substance is produced using at least inorganic fine grains produced by adding to a solution a solid matter substantially insoluble in the solution, promoting crystallization or precipitation in the solution to produce crystal or precipitate, and separating out the resulting crystal or precipitate, the solution including a mixture of a $BaI_2$ aqueous solution, which contains at least one rare earth element, and a fluoride aqueous solution, a Ba concentration in the solution being not more than 3.0 mol/liter, a F/Ba molar ratio being not more than 1, and the inorganic fine grains being represented by the following basic composition formula (I), having a hexahedral form and having a volume-average grain size of 1 to 10 μm:

$$BaFI:xLn \qquad (I)$$

wherein Ln represents at least one element selected from the group consisting of Ce, Pr, Sm, Eu, Tb, Dy, Ho, Nd, Er, Tm and Yb, and x represents a value in the range $0<x\leq 0.2$.

15. The rare earth element-activated barium fluorohalide fluorescent substance according to claim 14, which is represented by the following basic composition formula (II):

$$(Ba_{1-a}, M^{II}{}_a)FX \cdot bM^{I} cM^{III} \cdot dA:xLn \qquad (II)$$

wherein $M^{II}$ represents at least one alkaline earth metal selected from the group consisting of Sr, Ca and Mg, $M^{I}$ represents at least one alkali metal selected from the group consisting of Li, Na, K, Rb and Cs, $M^{III}$ represents at least one compound of a trivalent metal selected from the group consisting of Al, Ga, In, Tl, Sc, Y, Cd and Lu, except $Al_2O_3$, X represents at least one halogen selected from the group consisting of Cl, Br and I, Ln represents at least one rare earth element selected from the group consisting of Ce, Pr, Sm, Eu, Gd, Tb, Dy, Ho, Nd, Er, Tm and Yb, A represents at least one metal oxide selected from the group consisting of $Al_2O_3$, $SiO_2$ and $ZrO_2$, and a, b, c, d and x represent values in the ranges $0\leq a\leq 0.3$, $0\leq b\leq 2$, $0\leq c\leq 2, 0\leq d\leq 0.5$ and $0<x\leq 0.2$, respectively.

16. A radiation image conversion panel comprising, on a substrate, at least one fluorescent substance layer, said layer containing at least one rare earth element-activated barium fluorohalide fluorescent substance produced from at least inorganic fine grains that are represented by the following basic composition formula (I), have a hexahedral form and have a volume-average grain size of 1 to 10 μm:

$$BaFI:xLn \qquad (I)$$

in which Ln represents at least one element selected from the group consisting of Ce, Pr, Sm, Eu, Tb, Dy, Ho, Nd, Er, Tm and Yb, and x represents a value in the range $0<x\leq 0.2$, wherein the inorganic fine grains are produced by adding to a solution a solid matter substantially insoluble in the solution, promoting crystallization or precipitation in the solution to produce crystal or precipitate, and separating out the resulting crystal or precipitate, the solution including a mixture of a $BaI_2$ aqueous solution, which contains at least one rare earth element, and a fluoride aqueous solution, a Ba concentration in the solution being not more than 3.0 mol/liter, and a F/Ba molar ratio being not more than 1.

17. The radiation image conversion panel according to claim 16, wherein the fluorescent substance layer comprises a thickness of 20 μm to 1 mm.

* * * * *

UNITED STATES PATENT AND TRADEMARK OFFICE
CERTIFICATE OF CORRECTION

PATENT NO. : 6,706,211 B2
DATED : March 16, 2004
INVENTOR(S) : Hiroshi Matsumoto It is certified that error appears in the above-identified patent and that said Letters Patent is hereby corrected as shown below:

Column 16,
Line 48, should read -- The process for producing inorganic fine grains according to claim 1, wherein the step of promoting one of crystallization and precipitation occurs at a temperature of 20 to 100ºC. --

Column 17,
Line 54, should read -- The inorganic fine grains according to claim 11, wherein the inorganic fine grains have an aspect ratio of 0.5 to 2. --

Column 18,
Line 60, should read -- The radiation image conversion panel according to claim 16, wherein the fluorscent substance layer has a thickness of 20 $\mu$m to 1 mm. --

Signed and Sealed this

Tenth Day of May, 2005

JON W. DUDAS
*Director of the United States Patent and Trademark Office*